(12) United States Patent
Nakajima

(10) Patent No.: US 9,225,585 B2
(45) Date of Patent: Dec. 29, 2015

(54) METHOD AND SYSTEM FOR DEVICE MANAGEMENT, AND SERVER

(71) Applicant: Masato Nakajima, Tokyo (JP)

(72) Inventor: Masato Nakajima, Tokyo (JP)

(73) Assignee: RICOH COMPANY, LIMITED, Tokyo (JP)

(*) Notice: Subject to any disclaimer, the term of this patent is extended or adjusted under 35 U.S.C. 154(b) by 249 days.

(21) Appl. No.: 13/796,129

(22) Filed: Mar. 12, 2013

(65) Prior Publication Data

US 2013/0254367 A1 Sep. 26, 2013

(30) Foreign Application Priority Data

Mar. 21, 2012 (JP) ................. 2012-064468

(51) Int. Cl.
G06F 15/16 (2006.01)
H04L 12/24 (2006.01)
H04L 29/06 (2006.01)

(52) U.S. Cl.
CPC ............ *H04L 41/00* (2013.01); *H04L 41/0853* (2013.01); *H04L 63/08* (2013.01)

(58) Field of Classification Search
CPC ... G06F 19/3406; G06F 19/322; H04L 63/30; H04L 12/66; H04L 41/0213; H04L 29/06027
USPC .............. 709/204, 219, 223; 380/270
See application file for complete search history.

(56) References Cited

U.S. PATENT DOCUMENTS

| | | | | |
|---|---|---|---|---|
| 5,943,478 A * | 8/1999 | Aggarwal | ............ | G06Q 10/107 709/229 |
| 2003/0041108 A1* | 2/2003 | Henrick | ............ | G06F 17/30873 709/205 |
| 2008/0034097 A1* | 2/2008 | Nomura | ............ | H04L 29/12009 709/227 |
| 2008/0301262 A1* | 12/2008 | Kinoshita | ........... | H04L 12/2812 709/219 |
| 2009/0178128 A1* | 7/2009 | Chiba | ................. | H04L 67/14 726/7 |
| 2010/0228978 A1* | 9/2010 | Kudo | ................ | H04L 29/12452 713/168 |
| 2011/0007901 A1* | 1/2011 | Ikeda | ....................... | H04B 5/02 380/270 |
| 2011/0125844 A1* | 5/2011 | Collier | ................ | H04L 12/2602 709/204 |
| 2011/0312278 A1* | 12/2011 | Matsushita | ....... | H04L 12/40013 455/66.1 |
| 2012/0019674 A1* | 1/2012 | Ohnishi | ................. | G08C 17/00 348/207.1 |
| 2013/0247117 A1* | 9/2013 | Yamada | ................ | G08C 17/02 725/93 |

FOREIGN PATENT DOCUMENTS

JP 2009-32277 2/2009

* cited by examiner

*Primary Examiner* — Tesfay Yohannes
(74) *Attorney, Agent, or Firm* — Oblon, McClelland, Maier & Neustadt, L.L.P.

(57) ABSTRACT

A device management system includes a first server and a second server. The first server includes a receiving unit configured to receive an operation request for acquiring specific information about a designated device, and a transfer unit configured to transfer the operation request to the second server. The second server includes an authentication unit configured to authenticate a device in a local network in response to an authentication request from the device, a connection maintaining unit configured to maintain communication connection with the device that the authentication is successful, a receiving unit configured to receive the operation request transferred from the first server, and an executing unit configured to execute a content of the operation request by carrying out communications in real time with the designated device that is in communication connection with the second server when the operation request is received.

8 Claims, 5 Drawing Sheets

METHOD AND SYSTEM FOR DEVICE MANAGEMENT, AND SERVER

CROSS-REFERENCE TO RELATED APPLICATION

The present application claims priority to and incorporates by reference the entire contents of Japanese Patent Application No. 2012-064468 filed in Japan on Mar. 21, 2012.

BACKGROUND OF THE INVENTION

1. Field of the Invention

The present invention generally relates to a device management method, a device management system, and a server.

2. Description of the Related Art

There are known device management systems that remotely manage devices such as a multifunction peripheral (MFP), a printer, and a home electrical product in a local network via the Internet. In such a device management system, remote management is typically implemented in such a manner that an intermediary device arranged in a local network transmits/receives device management information to/from a management server arranged outside the local network (see Japanese Patent Application Laid-open No. 2009-32277, for example).

However, the conventional technique is disadvantageously incapable of real-time data communications. This is because data communications between the management server outside the local network and a device in the local network are carried out only after a communication request for communications with the device is issued and, in response to the request, communications therebetween are established.

Therefore, there is a need to provide a device management system capable of real-time communications with a managed device.

SUMMARY OF THE INVENTION

It is an object of the present invention to at least partially solve the problems in the conventional technology.

According to an embodiment, there is provided a device management system that includes a first server and a second server. The first server includes a receiving unit configured to receive an operation request for acquiring specific information about a designated device, and a transfer unit configured to transfer the operation request to the second server. The second server includes an authentication unit configured to authenticate a device in a local network in response to an authentication request from the device, a connection maintaining unit configured to maintain communication connection with the device that the authentication is successful, a receiving unit configured to receive the operation request transferred from the first server, and an executing unit configured to execute a content of the operation request by carrying out communications in real time with the designated device that is in communication connection with the second server when the operation request is received.

According to another embodiment, there is provided a device management method performed in a device management system that includes a first server and a second server. The device management method includes receiving an operation request for acquiring specific information about a designated device in the first server; transferring the operation request to the second server in the first server; authenticating a device in a local network in response to an authentication request from the device in the second server; maintaining communication connection with the device that the authentication is successful in the second server; receiving the operation request transferred from the first server in the second server; and executing, in the second server, a content of the operation request by carrying out communications in real time with the designated device that is in communication connection with the second server when the operation request is received.

According to still another embodiment, there is provided a server that includes an authentication unit configured to authenticate a device in a local network in response to an authentication request from the device; a connection maintaining unit configured to maintain communication connection with the device that the authentication is successful; a receiving unit configured to receive the operation request transferred from another server that receives an operation request for acquiring specific information about a designated device; and an executing unit configured to execute a content of the operation request by carrying out communications in real time with the designated device that is in communication connection with the server when the operation request is received.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. Each embodiment is implemented in a device management system that remotely manages one or more MFPs; however, a managed device to be managed by the device management system can be changed as appropriate. Examples of the managed device include an image forming apparatus, a printer, a copier, a facsimile, and a projector.

First Embodiment

Figure 1:
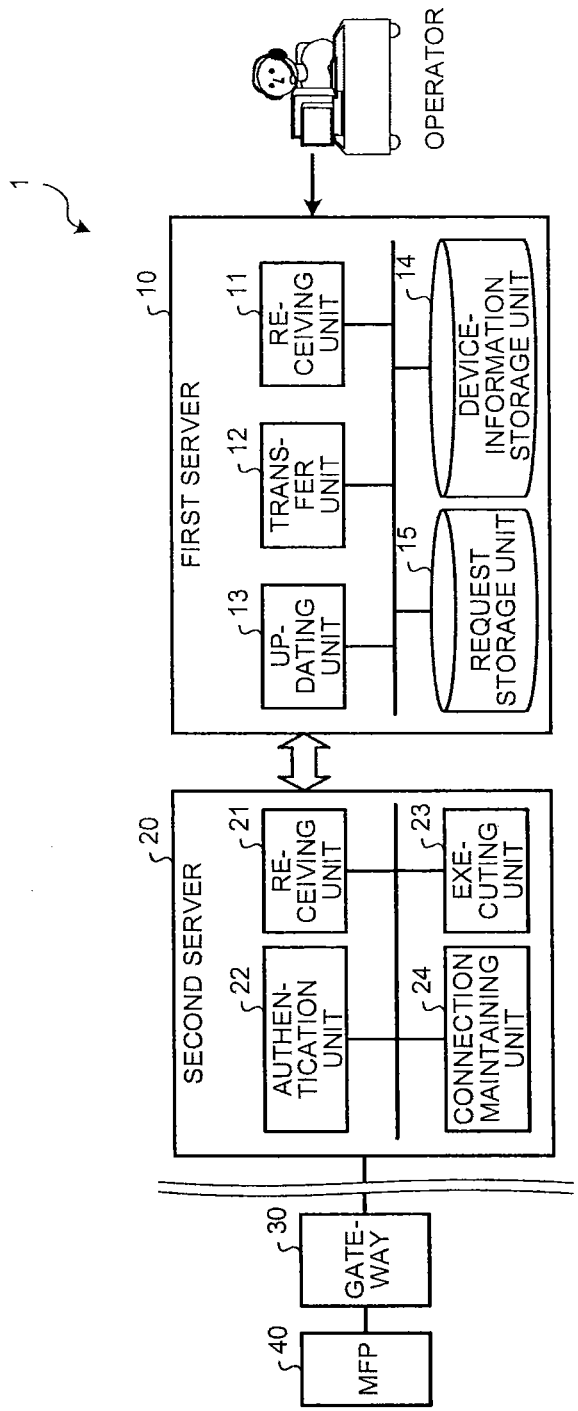
FIG. 1 is a functional diagram of a device management system according to a first embodiment of the present invention.

FIG. 1 is a block diagram illustrating a functional configuration of the device management system 1. As illustrated in FIG. 1, the device management system 1 includes a first server 10 and a second server 20. The device management system 1 manages one or more MFPs 40, which are managed devices, in a local network constructed inside a gateway 30 remotely over a network such as the Internet. The first server 10 is a server that receives an operation request command concerning one of the MFPs 40 input by an operator. The first server 10 includes a receiving unit 11, a transfer unit 12, an updating unit 13, a device-information storage unit 14, and a request storage unit 15. A configuration in which an operation request command is executed not only in response to an operation request manually input by an operator but also automatically executed in accordance with a preset schedule can be employed. The second server 20 is a server that receives the operation request command transferred from the first server 10 and carries out data communications with the MFP 40 in real time. The second server 20 includes a receiving unit 21, an authentication unit 22, an executing unit 23, and a connection maintaining unit 24.

The receiving unit 11 receives an operation request command to acquire specific information about a designated device input by an operator. The operation request command can be a command issued, for instance, to manage a continuously varying parameter, such as a continuous operation time or a toner level of the MFP 40, by keeping track of the parameter. Real-time communications are required also in emergency where the MFP 40 is desirably remotely directly controlled and the like. An operator transmits such an operation request, in which desired one the MFPs 40 is designated, from a predetermined terminal to the receiving unit 11. Any information by which a device can be identified can be used to designate the MFP 40. Examples of the information include identification information, an IP address, and a MAC address of the MFP 40.

The transfer unit 12 transfers the operation request command received by the receiving unit 11 to the second server 20. The updating unit 13 stores a status of a response, which is a response to the operation request command, transmitted from the designated MFP 40 in the request storage unit 15. Accordingly, in a case where data indicating that a response is transmitted from the MFP 40 within predetermined time period is not stored in the request storage unit 15, the transfer unit 12 transfers the operation request command to the second server 20 again or sends a notification that no response is transmitted from the MFP 40 to the operator.

The device-information storage unit 14 stores therein data for managing a list of managed devices as a device information table. The device-information storage unit 14 is implemented as a hard disk drive (HDD), for example. The device information table contains data about device IDs, device addresses, and management information. The transfer unit 12 can discover location of the MFP 40, to which is data is to be transmitted, by searching the device information table by the device ID contained in the operation request command. When a response to the operation request command is received from the MFP 40, the updating unit 13 updates received information about the managed device.

The request storage unit 15 stores the operation request command in a request management table. The request management table contains, for instance, data about a request command ID, a request command type, a destination device ID, transmission date/time, response date/time, and status. The request command ID is unique information that is issued each time an operation request command is forwarded by an operator. The request command type is data indicating a type of the request command. The destination device ID is a device ID of the device designated in the operation request command. The status is data indicating a processing status, such as "transmitted", "response received", or "to be transmitted", of the operation request command. In the first embodiment, when the receiving unit 11 receives an operation request command, the receiving unit 11 creates a request command ID, and generates new request records which are the request command ID, a command type, a device ID, and transmission date/time. When a response to the operation request command is received from the MFP 40, or when data transmission failure should occur, the updating unit 13 updates values of response date/time and the status.

The receiving unit 21 receives an operation request command transferred from the first server 10. The authentication unit 22 receives an authentication request from the MFP 40, which is a managed device, to authenticate the MFP 40. The authentication is performed using, for instance, a combination of a device ID and a password.

The executing unit 23 carries out real-time data communications with the MFP 40 which is a managed device. Specifically, the executing unit 23 can transfer an operation request command to the MFP 40 in real time and also acquires management information requested in the operation request command as a response from the MFP 40. The data communications are performed using a protocol, such as Extensible Messaging and Presence Protocol (XMPP), which allows real-time communications between devices.

The connection maintaining unit 24 maintains a communication session with the authenticated MFP 40 in a constantly-connected state. This session can be encrypted with Secure Sockets Layer (SSL).

The gateway 30 has functions including a function of distributing load and a function as a firewall. The gateway 30 can be omitted.

Figure 2:
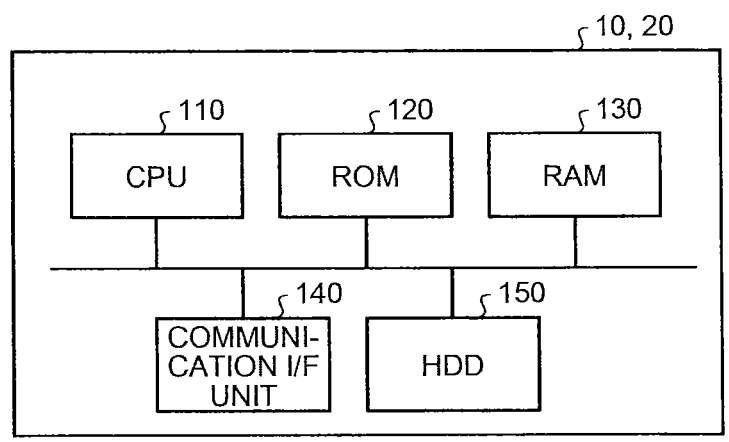
FIG. 2 is a diagram illustrating a hardware configuration of a server according to the first embodiment.

A hardware configuration of the first server 10 and the second server 20 is described below with reference to FIG. 2. As illustrated in FIG. 2, each of the first server 10 and the second server 20 includes a central processing unit (CPU) 110, a read only memory (ROM) 120, a random access memory (RAM) 130, a communication interface (I/F) unit 140, and an HDD 150. The units, or functional blocks, described above are stored in the HDD 150 as program instructions, for example. Communications between the servers and communications with the MFP 40 are carried out via the communication I/F unit 140.

Figure 3:
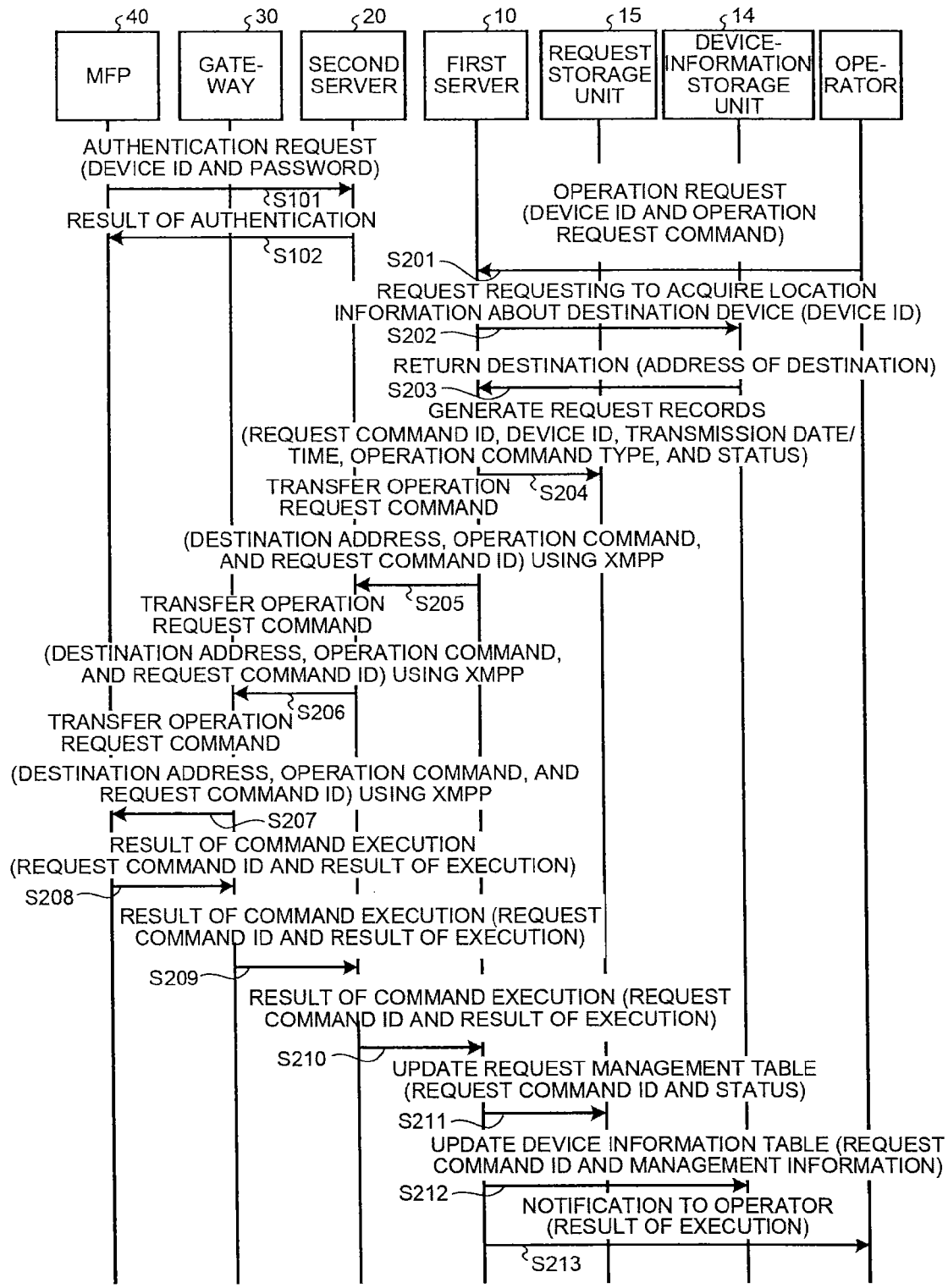
FIG. 3 is a sequence diagram illustrating a processing procedure of the device management system according to the first embodiment.
Figure 4:
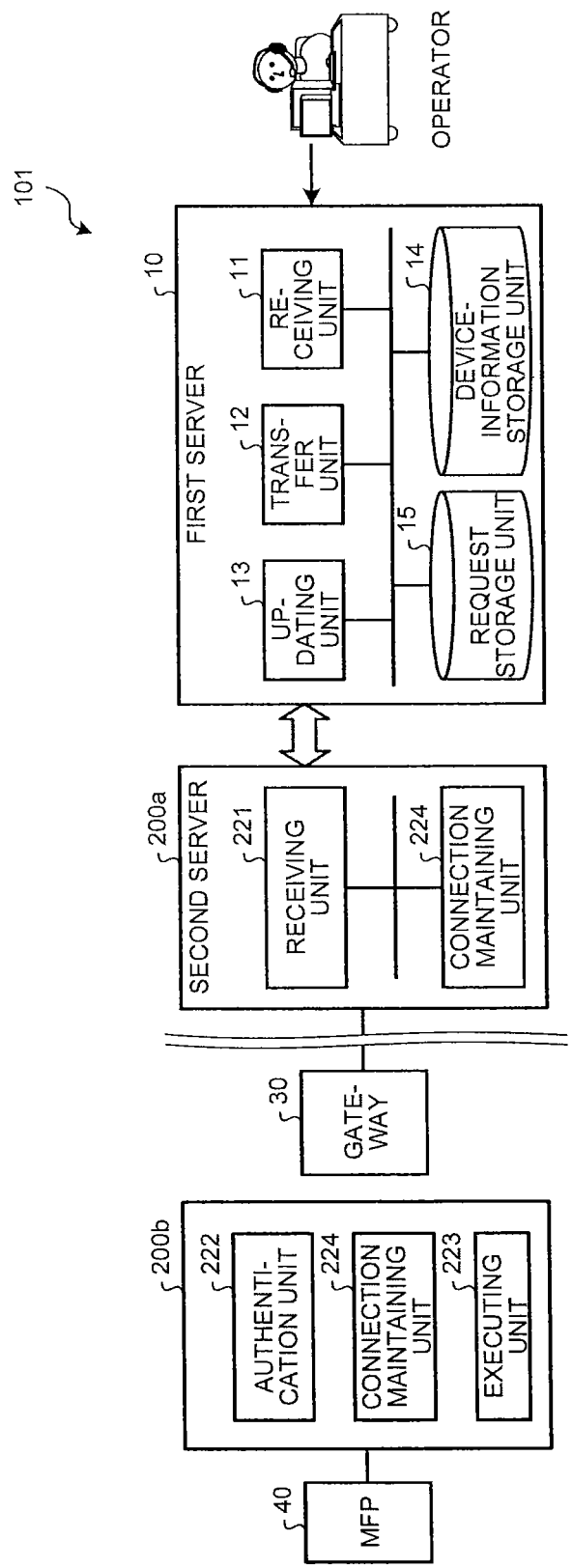
FIG. 4 is a functional diagram of a device management system according to a second embodiment of the present invention.

Processing procedures for communications in the device management system 1 according to the first embodiment are described below with reference to a sequence diagram illustrated in FIG. 3. As illustrated in FIG. 3, first, the MFP 40 transmits to the second server 20 an authentication request with a device ID and a password of the MFP 40 via the gateway 30 (Step S101). If the authentication for the MPF 40 is successful, the authentication unit 22 returns a result of the authentication to the MFP 40, and the connection maintaining unit 24 maintains a communication session with the MFP 40 (Step S102). In this state, the second server 20 and the MFP 40 can carry out real-time communications.

Meanwhile, an operator transmits an operation request, which contains a device ID and an operation request command, to the first server 10 (Step S201). Subsequently, the first server 10 issues to the device-information storage unit 14 a request requesting to acquire location information about a destination device designated by the device ID (Step S202). The device-information storage unit 14 returns an address of the destination device as a response to the request (Step S203).

Subsequently, the first server 10 creates a new request command ID based on the operation request command, and stores the device ID, transmission date/time, a command type, and "transmitted" as the status, which are contained in the operation request command, as request records in the request storage unit 15 (Step S204). The first server 10 transfers the operation request command to the second server 20 using XMPP protocol (Step S205). The operation request command contains the destination address, the operation request command, and the request command ID.

The second server 20 transfers the operation request command to the MFP 40 via the gateway 30 (Steps S206 and S207). Because this transfer is also performed using XMPP, data transfer to the MFP 40 is performed in real time. As a result of execution of the operation request command, the MFP 40 transmits the request command ID and an execution result which is, for instance, requested management information to the second server 20 via the gateway 30 in real time (Steps S208 and S209).

The second server 20 transfers the result of execution of the operation request command to the first server 10 (Step S210). The first server 10 updates data about "status" in the request management table of the request storage unit 15 to "response received" because the response to the operation request command is returned (Step S211). The first server 10 also updates data on "management information" in the device information table according to the received response to the transmission request command (Step S212). The first server 10 finally sends a notification about the result of execution to the operator (Step S213).

In the device management system 1 according to the first embodiment, a communication session that allows real-time communications between a managed device and the server is maintained after the server completes authentication of the managed device. Accordingly, the server and the device can carry out real-time communications through this communication session.

When such real-time communications are enabled, it becomes possible to collect detailed information about a device in the local network or to remotely reconfigure settings of the device in emergency, e.g., in the event of a trouble, in real time.

Second Embodiment

A device management system according to a second embodiment of the present invention is described below. In the device management system 101 according to the second embodiment, the second server is functionally divided into a section (second server 200b) arranged inside a local network and a section (second server 200a) arranged outside the local network. The second server 200a outside the local network includes a receiving unit 221 and a connection maintaining unit 224. The second server 200b inside the local network includes an authentication unit 222, an executing unit 223, and the connection maintaining unit 224. The second server 200a outside the local network discovers location of the second server 200b inside the local network by utilizing Domain Name System (DNS) or the like.

Figure 5:
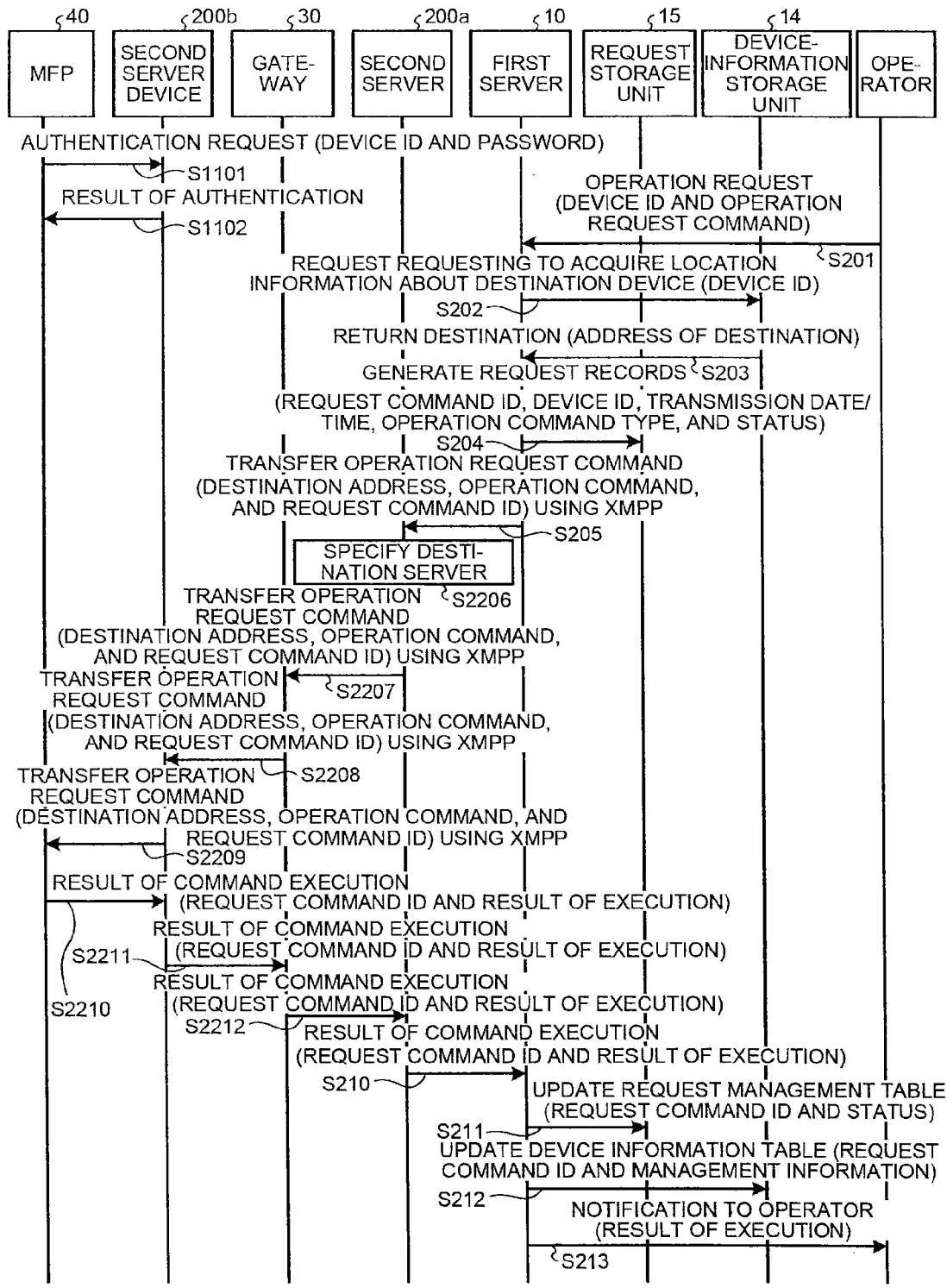
FIG. 5 is a sequence diagram illustrating a processing procedure of the device management system according to the second embodiment.

FIG. 5 is a sequence diagram illustrating a processing procedure of the device management system 101 according to the second embodiment. Operations that are same as those in the first embodiment are denoted by the same step numbers, and only operations of the second embodiment that differ from those of the first embodiment are described below.

The MFP 40 first transmits an authentication request to the second server 200b inside the local network (Step S1101). When the second server 200b is successfully authenticated, the second server 200b maintains a communication session with the MFP 40 (Step S1102).

When receiving an operation request command transferred from the first server 10, the second server 200a specifies the second server 200b that is managing a destination device designated in the operation request command by a device ID (Step S2206). Specifically, in a situation where the device management system 1 includes a plurality of devices and the second server 200b in a plurality, which device is managed by which one of the second servers 200b is determined for each of the devices in advance. The second server 200a specifies one of the second servers 200b that is managing the destination device based on the device ID. The second server 200a obtains location information about the specified second server 200b from a DNS server (not shown) or the like, and carries out real-time communications with the gateway 30, the second server 200b, and the MFP 40 (Steps S2207 to S2212).

Each of the device management systems according to the embodiments can be modified as follows. For example, there can be employed a modification in which a server that converts HyperText Transfer Protocol (HTTP) data transfer into XMPP data transfer is disposed between the gateway 30 and the second server 20 to enable pseudo XMPP communications even in a local network environment where XMPP communications are not supported.

There can be employed a configuration in which the first server 10 and the second server 20 are not implemented in different hardware but implemented in the same hardware. There can be employed a configuration in which communications between the servers and the MFPs are carried out using Bidirectional-streams Over Synchronous HTTP (BOSH) (i.e., HTTP+XMPP) protocol to ensure firewall transparency.

The program executed in the servers according to the embodiments may be provided as a computer-readable storage medium stored therein installable or executable file(s). The computer-readable storage medium is, for instance, a compact disk (CD)-ROM, a flexible disk (FD), a CD-recordable (CD-R), or a digital versatile disk (DVD).

The program executed in the servers according to the embodiments may be configured to be stored in a computer connected to a network such as the Internet to be downloaded through the network. The program executed in the servers according to the embodiments may be configured to be provided or distributed over a network such as the Internet.

The program executed in the servers according to the embodiments has a module structure made up of the units described above (the receiving unit 11, the transfer unit 12, the updating unit 13, the receiving unit 21, the authentication unit 22, the executing unit 23, and the connection maintaining unit 24). From the viewpoint of actual hardware, the CPU 110 (processor) reads out the program from the ROM 120 and executes the program, thereby loading the units on a main memory device to generate the receiving unit 11, the transfer unit 12, the updating unit 13, the receiving unit 21, the authentication unit 22, the executing unit 23, and the connection maintaining unit 24 on the main memory device.

According to the embodiments, it is possible to carry out real-time communications with a managed device is obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device management system, comprising:
a first server; and
a second server, wherein
the first server includes a receiving unit configured to receive, from a client device, an operation request for acquiring specific information about a designated device different than the client device, and a transfer unit configured to transfer the operation request to the second server, and the second server includes an authentication unit configured to authenticate the designated device in a local network in response to an authentication request from the designated device, a connection maintaining unit configured to maintain a real-time, bidirectional communication connection with the designated device via a firewall after the authentication is successful so that the designated device and the second server are in a constantly connected state via the firewall after the authentication, a receiving unit configured to receive the operation request transmitted by the first server, and an executing unit configured to execute a content of the operation request by carrying out communications in real time via the firewall with the designated device, the designated device being in communication connection in the constantly connected state with the second server when the operation request is transmitted by the first server and received by the second server, wherein the second server carries out the communications with the designated device using XMPP protocol.

2. The device management system according to claim 1, wherein the first server further includes a request memory configured to store identification information about the designated device, the operation request, and a result of a response from the designated device to the operation request in association with one another, and an updating unit configured to update the result of the response according to whether a response is transmitted from the second server.

3. The device management system according to claim 1, wherein the second server is functionally divided into a first server unit arranged inside the local network and a second server unit arranged outside the local network, the second server unit specifies the first server unit that is in communication connection with the designated device for which the operation request transmitted by the first server is concerned, and transfers the operation request to the specified first server unit, and the first server unit that receives the operation request executes the content of the operation request by carrying out real-time communications with the designated device that is constantly in communication connection with the first server unit.

4. A device management method performed in a device management system that includes a first server and a second server, the device management method comprising:

authenticating a designated device in a local network in response to an authentication request from the designated device in the second server;

maintaining a real-time, bidirectional communication connection with the designated device via a firewall after the authentication is successful in the second server so that the designated device and the second server are in a constantly connected state via the firewall after the authentication;

receiving, from a client device different than the designated device, an operation request for acquiring specific information about the designated device in the first server;

transmitting the operation request to the second server in the first server;

receiving the operation request transmitted by the first server in the second server; and executing, in the second server, a content of the operation request by carrying out communications in real time via the firewall with the designated device, the designated device being in communication connection in the constantly connected state with the second server when the operation request is transmitted by the first server and received by the second server, wherein the second server carries out the communications with the designated device using XMPP protocol.

5. The device management method according to claim 4, further comprising:

storing identification information about the designated device, the operation request, and a result of a response from the designated device to the operation request in association with one another in the first server; and updating the result of the response according to whether a response is transmitted from the second server in the first server.

6. The device management method according to claim 4, wherein the second server is functionally divided into a first server unit arranged inside the local network and a second server unit arranged outside the local network, the device management method further comprises:

specifying, in the second server unit, the first server unit that is in communication connection with the designated device for which the operation request transferred from the first server is concerned;

transferring the operation request to the specified first server unit in the second server unit; and receiving, in the first server unit, the operation request executes the content of the operation request by carrying out real-time communications with the designated device that is constantly in communication connection with the first server unit.

7. A server, comprising:

an authentication unit configured to authenticate a designated device in a local network in response to an authentication request from the designated device;

a connection maintaining unit configured to maintain a real-time, bidirectional communication connection with the designated device via a firewall after the authentication is successful so that the designated device and the second server are in a constantly connected state via the firewall after the authentication;

a receiving unit configured to receive, from a client device different from the designated device, an operation request transmitted by another server that receives the operation request for acquiring specific information about the designated device; and an executing unit configured to execute a content of the operation request by carrying out communications in real time via the firewall with the designated device, the designated device being in communication connection in the constantly connected state with the server when the operation request is transmitted by the another server and received by the server, wherein the server carries out the communications with the designated device using XMPP protocol.

8. The server according to claim 7, wherein the server is functionally divided into a first server unit arranged inside the local network and a second server unit arranged outside the local network, the second server unit specifies the first server unit that is in communication connection with the designated device for which the operation request transferred from the first server is concerned, and transfers the operation request to the specified first server unit, and the first server unit that receives the operation request executes the content of the operation request by carrying out real-time communications with the designated device that is constantly in communication connection with the first server unit.

\* \* \* \* \*